PUNCH TAPE CUTTER AND SPLICER

Filed July 6, 1964

INVENTOR.
DONALD T. AULD

BY Kenwood Ross

ATTORNEY.

United States Patent Office 3,209,635

Patented Oct. 5, 1965

3,209,635

PUNCH TAPE CUTTER AND SPLICER

Donald T. Auld, 85 Arbor Drive, Ho-Ho-Kus, N.J.

Filed July 6, 1964, Ser. No. 380,451
2 Claims. (Cl. 83—451)

My invention relates to structural refinements in tape or film splicing devices and the principal object thereof is the provision of a perforated tape or film splicing apparatus characterized by a supporting medium incorporating means to permit the butt splicing of the adjacent ends of tape or film.

The invention has adaptations for use by various types of businesses or organizations or persons having needs for correcting, repairing and/or altering tapes as well as joining tapes for continuous transmission.

By means of the invention hereof, a rapid and accurate method of end-to-end splicing of oiled or dry tapes, without the need for heat or moisture, is taught.

It is another object hereof to provide a perforated film or tape splicer cooperantly combined with a cutting instrumentality in the form of a circular and rotatable cutting shear which is movable longitudinally relative to a stationary shear blade, and with means for precluding unwanted movement of the tape or film during its operational use.

The apparatus hereof is envisioned for use with data processing tapes or communications, typesetting and machine control tapes, each of which is characterized by a plurality of aligned equally-spaced positioning openings strategically located along its longitudinal axis and a plurality of data openings disposed adjacent and on each side of the positioning openings. With tapes of such types, it is frequently necessary to delete obsolete or erroneous data or information or intelligence carried by a tape and/or to add additional or corrected data or information or intelligence thereto as by removing a segment from and/or splicing a new segment to the existing tape.

The apparatus hereof permits butt or end-to-end splicing so as to allow a thinner splice than is obtainable with the so-called over-lapping splice of the prior art, same being an important feature since the latter type splice frequently will not pass through the equipment with which tapes are used.

Additionally, the apparatus hereof envisions means for patching torn tapes. Tapes frequently tear through use and the splicing operation eliminates the necessity of preparing new tapes, and the apparatus of this invention lends itself admirably to such purpose.

Accordingly, it is a salient feature hereof to provide a splicing instrumentality having holding means comprising aligned pins so spaced as to correspond to the spacing of the positioning openings in various types of commercially available data tapes, whereby the tape may be securely held for accurate end-to-end butt splicing and/or cutting.

With the foregoing and various other novel features and advantages and other objects of my invention as will become more apparent as the description proceeds, the invention consists in certain novel features of construction and in the combination and arrangement of parts as will be hereinafter more fully described and referred to in connection with the accompanying drawing wherein.

Figure 1:
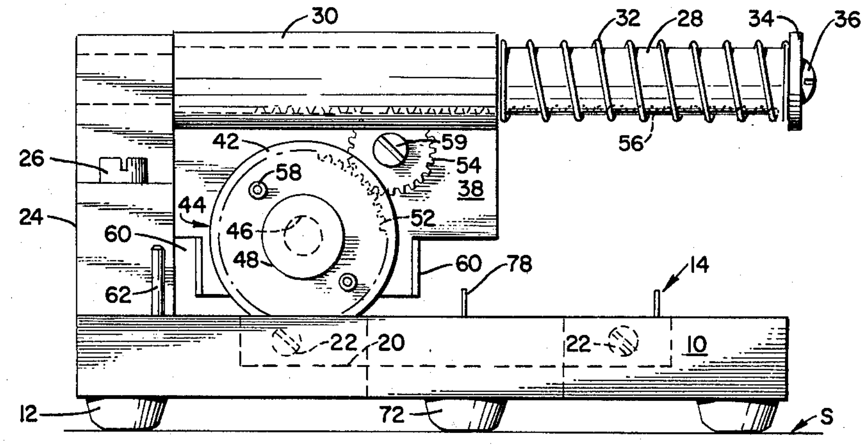
FIG. 1 is a view in side elevation of the apparatus of my invention.

Referring now to the drawing more in detail, the invention will now be fully described.

A film or tape support table 10 is provided which may be of any desired dimensions and has bumpers or cushions 12 fixed to its lower planar surface to support the device upwardly of a suitable supporting surface S, thereby to preclude any marring or scratching thereof.

A first groupment or set of aligned equally-spaced tape positioning pins, generally indicated by 14, extend upwardly from the upper planar surface of table 10. The pins of the groupment may be so disposed as to extend in a line longitudinally of the table rather than transversely thereof, as shown in the drawing and are so spaced and disposed as to be receivable through positioning openings or feed holes O of data processing tape T placed thereover. The openings O will be provided along the longitudinal axis of the tape throughout the length thereof. Tape T will also carry data thereon in the form of punched openings P disposed on either side of the feed holes O, all as is known.

Frequently it becomes desirable or necessary to remove erroneous or obsolete information from such a tape and/or to add new information thereto. In such case, it is necessary either to cut out the erroneous or obsolete information or to cut the tape so that the new information can be added thereto by splicing a length of new tape in the appropriate position along the existing tape, all as the case may be.

And, as aforesaid, tapes frequently become torn through usage and the splicing route eliminates the necessity of preparing new or substitute tapes.

Figure 2:
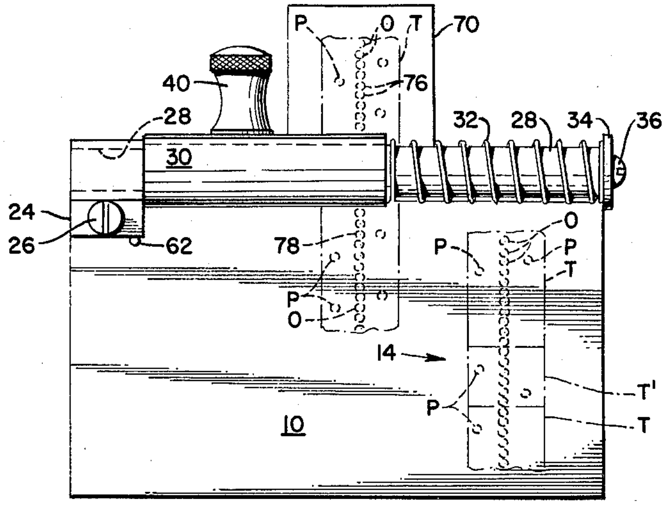
FIG. 2 is a view in top plan of the apparatus on a smaller scale.
Figure 3:
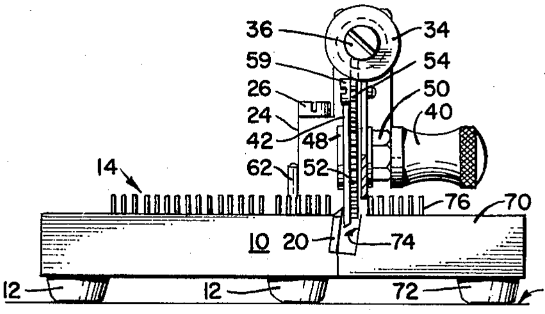
FIG. 3 is a view in end elevation as seen from the right of FIG. 2.

In FIG. 2, I have shown a segment or portion of a tape T′ to be integrated into the tape T.

Tape T is first cut by means of the cutting instrumentality hereof, subsequently to be referred to, so as to permit the addition thereto of the segment T′ carrying the information to be integrated thereinto.

Of course, segment T′ may be spliced directly to an end of tape T, without a need for cutting the latter, if appropriate.

Segment T′ is conditioned with a splicing cement on one of its surfaces and is placed on pins 14 centrally of the groupment thereof.

Tape T is also placed on the pins 14 adjacent segment T′ and the end or ends thereof is/are allowed to butt the adjacent cement-carrying end or ends of the tape T′, as the case may be. Following the butting, tape T, with segment T′ firmly welded thereto, is removed from the pins.

The pins permit perfect end-to-end integration of the segment T′ into tape T and insure exact alignment of the positioning holes and of the edges of the spliced members.

In addition to the splicing means above described, means are also provided for accurately cutting or severing tape T, as previously alluded to.

A stationary metal shearing blade 20, having an outermost cutting edge, is fixed to table 10 along a longitudinal length thereof and is seated in a suitable groove or recess in the table. As shown, it is secured thereto by means of bolts or screws 22.

An upstanding bracket or arm 24 is provided at one end of the table and is pivotally mounted upon a pivot pin 26 fixed to a post extending upwardly from the table so as to be swingable relative to the table.

A guide rod 28 has one end fixed in bracket 24 so as to be spaced upwardly of and in parallelism with stationary blade 20 and supports a body member 30 sleeved thereupon and reciprocable rectilinearly in forward and rearward directions therealong.

A spring 32 is also sleeved upon guide rod 28 between body member 30 and a spring retaining disc 34 fixed to the opposite free end of the guide rod as by a screw 36 or equivalent. Spring 32 provides for the controlled movement of body member 30 along and relative to guide rod 28.

Body member 30 is provided with a unitary depending portion 38 from which projects laterally and outwardly a manually engageable handle 40 whereby movement of the body member relative to and along the axis of guide rod 28 is facilitated.

An annular rotatable cutter shear 42, having a peripheral cutting edge 44, is fixedly mounted upon a shaft 46 which extends from handle member 40 and through the depending portion 38 of body member 30. Shaft 46 has an enlarged disc-like head 48 at its outer free end for embracement with a planar face of cutter shear 42 and has a lock nut 50 threaded thereon and disposed between handle member 40 and depending portion 38, whereby cutter shear 42 is locked against lateral movement relative to shaft 46.

Rotative movement of cutter shear 42 is effectuated by a drive gear 52 which meshes with a spur gear 54 which in turn meshes with a rack 56 formed on one side of and along the length of guide rod 28.

Drive gear 52 is fixed to the inner planar face of cutter shear 42 as by rivets 58 or equivalent, and is disposed upon shaft 46 between cutter shear 42 and depending portion 38.

Spur gear 54 is rotatably mounted upon a pivot screw 59 provided in depending portion 38 and is so strategically located as to permit spur gear 54 to mesh with drive gear 52 and with rack 56.

On opposite sides of cutter shear 42, guards 60 integral with depending portion 38 are provided to protect the operator from the sharp cutting action of the cutter shear. The guards extend inwardly at right angles from the depending portion beyond the vertical plane of the cutting shear.

Body member 30 is swingable upon guide rod 28 and may be brought into and out of the vertical position shown in the drawing as the body member may be preferred to be located in positions other than adjacent stationary blade 20. Furthermore, by such swingability, various pressures may be exerted upon body member 30 so as to bring cutter shear 42 into various degrees of engagement with stationary blade 20.

Additionally, guide rod 28 and cutter shear 42 may be moved to a non-operative angular position relative to stationary blade 20 by means of pivoting bracket 24 upon pivot pin 26.

A pin 62 fixed to table 10 and extending upwardly therefrom adjacent bracket 24 serves to preclude any rotation of the bracket beyond the operative and non-operative positions of guide rod 28 and cutter shear 42.

A supplemental tape support table 70 is fixed to an edge of table 10 by any suitable means and is disposed substantially centrally thereof and perpendicular thereto. It is supported upwardly of supporting surface S by a cushion or bumper 72, and its upper planar surface is coplanar with the upper planar surface of table 10.

A longitudinally-extending groove 74 is provided along the inboard edge of table 70 so as to face stationary blade 20 and to permit the passage of cutter shear 42 between the supplemental table and table as body member 30 is moved forwardly and rearwardly relative to guide rod 28.

A second groupment or set comprising a plurality of equally-spaced, aligned tape-positioning pins 76 extends upwardly from table 70 along the central axis of said table so as to be disposed perpendicular to stationary blade 20. These pins are aligned with a third groupment of similar upright, equally-spaced, aligned tape-positioning pins 78 provided on table 10 adjacent stationary blade 20.

Pins 76 and 78 are so spaced and disposed as to be receivable in openings O of the data processing tape T in manner similar to the splicing pins 14 previously described.

In using the device to cut the tape, guide rod 28 and its cooperant body member 30 and cutter shear 42 are first swung to an inoperative position at an angle relative to stationary blade 20 thereby to provide ready access to pins 76 and 78 whereupon tape T may be rested upon tables 10 and 70, with pins 76 and 78 being received in openings O of the tape, and with the portion of the tape to be cut overlying stationary blade 20. Guide rod 28 and its cooperant body member 30 and cutter shear 42 are now swung back to operative position with cutter shear 42 contacting stationary blade 20, and body member 30 is moved to the right, as seen in FIGS. 1 and 2, by means of handle 40. As body member 30 is moved relative to guide rod 28, cutting edge 44 of cutter shear 42 is pressed against stationary blade 20, and spring 32 insures a smooth, controlled movement of the body member.

Movement of the body member induces a rotation of cutter shear 42 by virtue of the action of spur gear 54 upon drive gear 52 fixed to the cutter shear, and the rotating cutter shear cuts transversely through tape T disposed in its path.

Pins 76 and 78 preclude any movement of the tape as this cutting ensues, thereby to insure a true straight-line cut.

Following severing of the tape, the guide rod and its cooperant parts may once again be swung to a non-operative position, whereupon the two portions of tape may be removed from the pins, and one or both portions may be repositioned upon pins 76 and 78 for additional cutting, or the portions of tape may be moved to the aligned splicing pins 14 for the insertion of new information into the tape, as previously described.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A splicing and cutting device for tape or film of the type having equally spaced positioning holes comprising, a tape or film support table, a plurality of spaced aligned splicing pins on said support table, the spacing between said splicing pins corresponding to the spacing between the positioning holes in the tape wherefore the adjacent ends of segments of the tape disposed on said splicing pins may be butt spliced, a stationary shearing blade fixed to an edge of said support table, an upstanding bracket pivotally mounted on said upper surface of said support table adjacent the edge of the latter carrying said stationary shearing blade, a guide rod fixed to said bracket and disposed in spaced parallel relation to the plane of said support table, a body member swingably and slidably mounted on said guide rod, an annular cutter shear rotatably mounted on said body member, a peripheral cutting edge on said cutting shear normally contacting said stationary shearing blade, a system of gearing for rotating said cutter shear as said body member is reciprocated relative to said guide rod, a supplemental tape or film support table fixed to the edge of said support table carrying said stationary shearing blade, said supplemental support table being disposed substantially centrally of said support table and perpendicular thereto and coplanar therewith to allow swinging movement of said body member relative to said guide rod to move said annular cutting shear into and out of contact with said stationary shearing blade, and spaced aligned positioning pin means on said support table and on said supplemental support table disposed on an axis transverse to the axis of movement of said cutter shear, the spacing between said pin means corresponding to the spacing of the positioning holes in the tape, whereby the tape when disposed upon said pins is secured against movement and is properly positioned in the path of said cutter shear to be transversely cut by the latter.

2. In a splicing and cutting device as set forth in claim 1, wherein said system of gearing for rotating said cutter shear as said body member is reciprocated relative to said guide rod comprises, a drive gear fixed to said cutter shear, a spur gear rotatably mounted on said body member and meshing with said drive gear, and a plurality of teeth on said guide rod meshing with said spur gear.

References Cited by the Examiner

UNITED STATES PATENTS

| | | | |
|---|---|---|---|
| 943,221 | 12/09 | Engberg | 83—614 X |
| 954,705 | 4/10 | Slaybaugh et al. | 83—488 X |
| 2,327,223 | 8/43 | Silver | 83—614 X |
| 2,724,436 | 11/55 | Constantine. | |
| 2,833,350 | 5/58 | Merkur | 83—451 X |
| 3,090,269 | 5/63 | Porter | 83—488 X |
| 3,135,299 | 6/64 | Heckethorn | 83—564 X |
| 3,142,607 | 7/64 | Scherer | 83—588 X |

WILLIAM W. DYER, Jr., *Primary Examiner.*